United States Patent [19]

Gaewsky et al.

[11] Patent Number: 4,502,773

[45] Date of Patent: Mar. 5, 1985

[54] TWO ZONE INFRARED RANGING SYSTEM

[75] Inventors: John P. Gaewsky, Reading; Joseph E. Murray, Jr., Malden, both of Mass.

[73] Assignee: Polaroid Corporation, Cambridge, Mass.

[21] Appl. No.: 462,669

[22] Filed: Jan. 31, 1983

[51] Int. Cl.³ .............................................. G03B 3/00
[52] U.S. Cl. .................................................... 354/403
[58] Field of Search ........................... 354/25 A, 403

[56] References Cited

U.S. PATENT DOCUMENTS

| | | | |
|---|---|---|---|
| 3,173,347 | 3/1965 | Stimson et al. | 95/10 |
| 3,714,871 | 2/1973 | Bresson | 95/10 C |
| 3,736,057 | 5/1973 | Harvey | 354/25 A |
| 3,945,023 | 3/1976 | Stauffer | 354/25 |
| 3,988,747 | 10/1976 | Lermann et al. | 354/25 |
| 4,032,934 | 6/1977 | Hendrickson et al. | 354/25 |
| 4,047,022 | 9/1977 | Holle | 250/201 |
| 4,123,650 | 10/1978 | Hosoe et al. | 250/201 |
| 4,127,325 | 11/1978 | Ohtaki et al. | 354/32 |
| 4,160,159 | 7/1979 | Kakukawa et al. | 250/204 |
| 4,230,400 | 10/1980 | Wick et al. | 354/25 |
| 4,288,152 | 9/1981 | Matsuda | 354/25 A |
| 4,357,083 | 11/1982 | Johnson et al. | 354/22 |
| 4,429,968 | 2/1984 | Taka et al. | 354/403 |
| 4,460,259 | 7/1984 | Greivenkamp, Jr. et al. | 354/403 |
| 4,473,285 | 9/1984 | Winter | 354/403 |

OTHER PUBLICATIONS

The British Journal of Photography, Nov. 2, 1979, "Canon AF 35M Towards Ultimate Automation", by L. A. Mannheim.

*Primary Examiner*—Russell E. Adams
*Attorney, Agent, or Firm*—Edward S. Roman

[57] ABSTRACT

An economical dual zone active rangefinding system for a photographic camera operates upon the principle of triangulation without lateral displacement of either the radiation source or detector to provide an output signal indicative of whether the subject in the scene to be photographed is located in a select distance range from the photographic camera.

10 Claims, 3 Drawing Figures

TWO ZONE INFRARED RANGING SYSTEM

BACKGROUND OF THE INVENTION

1. Field of the Invention

This invention relates generally to a two zone ranging system for a photographic camera apparatus and, more particularly, to a two zone active infrared ranging system for a photographic camera apparatus utilizing a low output, low cost infrared emitting diode.

2. Description of the Prior Art

Infrared ranging systems for photographic cameras are now well known in the art. One such infrared ranging system by Canon operates on the well-known principle of triangulation by beaming an infrared signal at the subject to be photographed and establishing the subject distance from the manner in which the infrared signal is reflected. This rangefinding system consists of an infrared emitting diode that is shifted sidewards during the measuring cycle and a fixed receiving cell. The traveling infrared emitting diode moves through a path of about ten millimeters and during this time emits a continuous signal in a specific wavelength band chosen to avoid interference from natural infrared sources such as sunlight. Also, during this time a sensing cell monitors the intensity of the infrared radiation reflected from the subject and converts this to an output voltage which is measured. When the output voltage reaches a peak and starts to decline, a control circuit stops the movement of the traveling infrared emitting diode and this movement is coupled with the movement of the objective lens which moves from a near to a far focusing limit such that the peak voltage signal can be utilized to determine the optimal focal position of the lens. This ranging system allows the objective lens to be set to an infinite number of focal positions corresponding to any camera to photographic subject distance determined by the detection of the peak voltage as the infrared emitting diode is shifted sidewards. Ranging systems of the above-described type are referred to as active systems in that they require both a source of radiance preferably in the infrared frequency range and a radiation sensor for sensing the reflected radiance from the photographic subject. In addition, either the source or the receptor must be displaced laterally in order to achieve the rangefinding function by the principle of triangulation.

Simple rangefinding systems which do not require the mechanical complexity required to provide for the lateral displacement of either the radiation source or the radiation detector are also well known in the art as taught in U.S. Pat. No. 4,357,083, entitled "Method and Apparatus Using Weighted Range Signal for Controlling Photographic Functions", by Bruce K. Johnson et al., issued Nov. 2, 1982, in common assignment herewith. The rangefinding system of the aforementioned Johnson et al. patent operates by directing a preliminary pulse of radiation from a selectively energizeable light source toward a subject and thereafter evaluating the amplitude of the reflected pulse of radiation from the subject so as to determine a weighted range signal as a function of the amplitude of generally non-visible or infrared radiation frequencies. This rangefinding system thus also provides an output ranging signal indicative of the actual position of the photographic subject within the field of view of the camera.

Such precision, however, in the determination of the camera-to-subject range may not always be necessary particularly for the design of a low cost camera in which it may be only necessary to provide two focal settings for the objective lens corresponding to a near camera-to-subject distance range and a far camera-to-subject distance range.

Therefore, it is a primary object of this invention to provide a low cost active rangefinding system which operates to provide an output signal indicative of whether the photographic subject is located in either a near distance zone from the photographic camera or a far distance zone from the photographic camera.

It is a further object of this invention to provide a low cost two zone rangefinding system which operates on the well-known principle of triangulation without requiring lateral movement of either the radiation source or the radiation detector.

It is an even further object of this invention to provide a low cost two zone active infrared rangefinding system which can utilize a low cost, low output infrared emitting diode for a source of radiation.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

A dual zone ranging system for use with a photographic camera apparatus comprises means for transmitting radiation toward a scene to be photographed as well as means for detecting the radiation from the scene to be photographed. The means for detecting the radiation from the scene to be photographed operates to detect both ambient radiation as well as radiation emitted from the radiation emitting means and subsequently reflected from a subject in the scene to be photographed if the subject is located within a selected distance range from the photographic camera apparatus. The radiation detecting means also provides an output responsive to the detected radiation. Means are also provided for integrating the output from the detecting means for a first select period during which the radiation emitting means are rendered inoperative and for a second select period during which the radiation emitting means are rendered operative. Integrating means thereafter provide an output signal in response to the integration indicative of whether the subject in the scene to be photographed is located in the select distance range from the photographic camera.

This dual zone ranging system operates by emitting primarily radiation within the infrared frequency range. In addition, the integration during one of the selected periods is offset by the integration during the other of the selected periods and the output signal indicative of whether the subject is located in the select distance range is provided in response to this offsetting integration.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENTS

Figure 1:
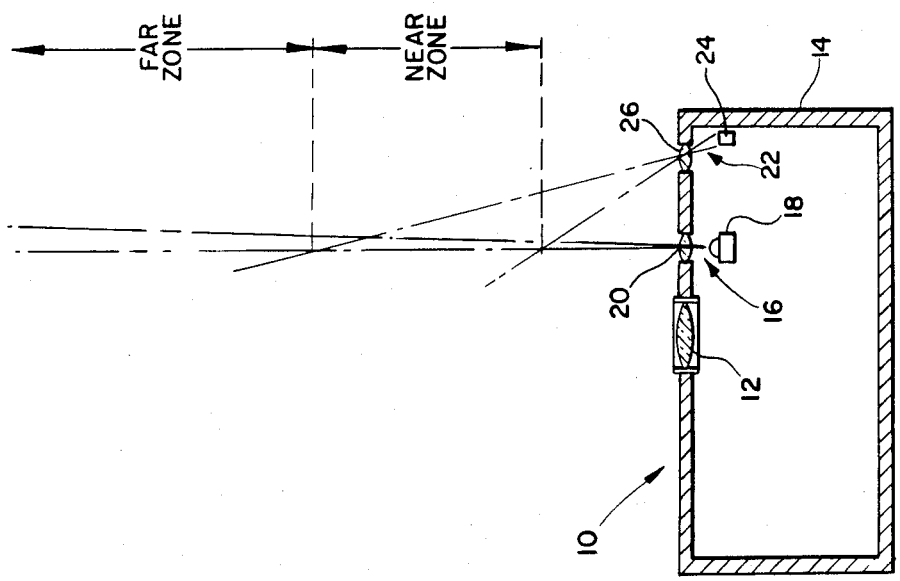
FIG. 1 is a cross-sectional view of a photographic camera apparatus embodying the rangefinding system of this invention.

Referring now to FIG. 1 there is shown in cross section a photographic camera apparatus 10 embodying the infrared rangefinding system of this invention. The photographic camera apparatus 10 comprises a housing 14 within the forward wall of which is fixedly disposed an objective lens 12 having a field of view extending forward of the camera in a well-known manner. Immediately adjacent the objective lens 12 there is disposed an infrared radiation transmitter as shown generally at 16 comprising an infrared emitting diode 18 and a lens 20 which operates to direct the infrared radiation from the diode 18 in a relatively narrow beam forward of the camera into the field of view of the objective lens 12. Beside the infrared radiation transmitter 16, there is provided a photometer 22 comprising a photoresponsive element 24 such as a silicon diode which receives radiation from the scene to be photographed by way of a photometer lens 26.

The photometer lens 26 and photoresponsive element 24 are arranged in accordance with the well-known principle of triangulation relative to each other and the field of view so as to detect only that infrared radiation transmitted by the infrared radiation transmitter 16 which is subsequently reflected by a photographic subject located within a select distance range from the photographic camera apparatus 10. The selected distance range is labeled in FIG. 1 "near zone" and may characteristically extend from a near distance of only a few inches from the photographic camera apparatus 10 to a far distance of five feet. Thus any subject in the scene to be photographed located within the near zone of FIG. 1 will reflect infrared radiation received from the infrared radiation transmitter 16 back for detection by the photometer 22, while conversely any subject in the scene to be photographed located beyond five feet from the photographic camera apparatus 10 in the far zone as shown in FIG. 1 will not reflect infrared radiation from the infrared transmitter 16 back for detection by the photometer 22.

Figure 3:
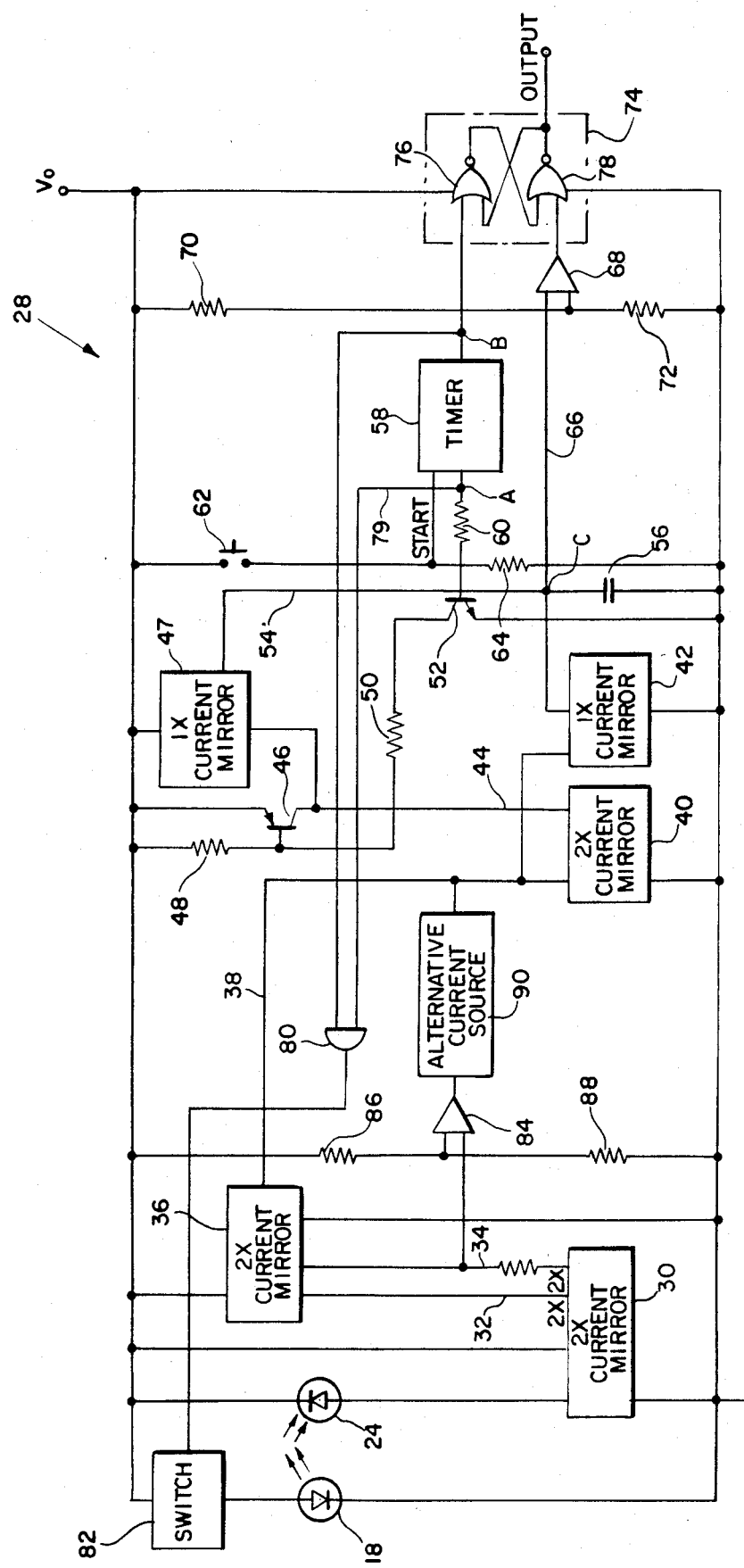
FIG. 3 is a circuit diagram of the rangefinding system of this invention.

Referring now to FIG. 3 in conjunction with FIG. 1 there is shown a circuit diagram for a ranging circuit 28 to be used in conjunction with the infrared radiation transmitter 16 and photometer 22 to provide an output ranging signal indicative of whether the subject in the scene to be photographed is located in the near zone as shown in FIG. 1. The photoresponsive element 24 provides an output current to a current mirror 30 which operates to multiply the output current from the photoresponsive element 24 by a factor of two. The current multiplied by the current mirror 30 is subsequently directed by way of a line 32 to another current mirror 36, which in like manner also operates to multiply the output current from the current mirror 30 by a factor of two. The current mirror 36, in turn, provides the multiplied output current by way of a line 38 to still another current mirror 40 which operates to again multiply the output current from the current mirror 36 by a factor of two. The multiplied output current from the current mirror 36 provided by line 38 is also simultaneously directed to another current mirror 42 which operates to multiply the output current from the current mirror 36 by a factor of one. The multiplied current from the current mirror 40 is thereafter directed by way of a line 44 to the collector terminal of a PNP control transistor 46 and to the input terminal of still another current mirror 47 which operates to multiply the output current from the current mirror 40 by a factor of one.

The PNP control transistor 46 receives base current by way of two resistors 48 and 50 which serially connect to the collector terminal of an NPN transistor 52 having a grounded emitter terminal. The base terminal of the transistor 52 receives a control current from a timer 58 by way of an interconnecting resistor 60.

The output current from the current mirror 47 is directed by way of a line 54 to the positive terminal of an integration capacitor 56 which also simultaneously connects to the output terminal of the current mirror 42. The voltage level at the positive terminal of the integration capacitor 56, in turn, is directed by way of a line 66 to one input terminal of a comparator 68, the other input terminal of which receives an input reference voltage by way of a resistor divider network comprising serially connected resistors 70 and 72. The output from the comparator 68, in turn, is directed to a latch circuit as shown at 74 comprising two NOR gates 76 and 78 connected in a well-known manner. The other input to the latch circuit 74 is received from the timer 58. The timer 58 may be actuated to initiate its timing function in the manner of this invention to be subsequently described upon the closure of a switch 62 connected to the start input terminal of the timer 58 and grounded by way of a resistor 64.

Figure 2:
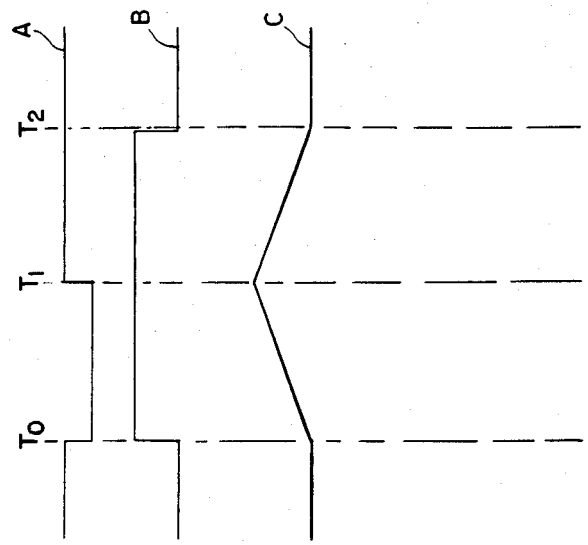
FIG. 2 is a graphical representation of signal waveforms at selected points in the rangefinding circuit of this invention.

Referring now to the timing diagram of FIG. 2 in conjunction with the circuit diagram of FIG. 3 it can be seen that a rangefinding operation is commenced upon the closure of the switch 62 to provide a start signal to the timer 58 at $T_0$ as shown in the timing diagram of FIG. 2. In response to the start signal, the timer 58 switches to provide at $T_0$ a low (binary logic 0) output signal level as shown by waveform A in FIG. 2 which signal is directed by way of base resistor 60 to turn off NPN transistor 52 and subsequently turn off PNP control transistor 46 so as to ultimately turn on current mirror 47. Simultaneous to this, the low (binary logic 0) output signal level A from the timer 58 is directed by way of a line 79 to one input terminal of an AND gate 80 so as to enable the AND gate 80 to provide a low (binary logic 0) output signal level. The low (binary logic 0) output signal level from the AND gate 80, in turn, is directed to a switch 82 to thereby turn the switch 82 off and insure that the infrared emitting diode 18 is also turned off. At time $T_0$ the timer 58 also switches to provide a high (binary logic 1) output signal level as shown by waveform B in FIG. 2 to the other input terminal of the AND gate 80 as well as to one input terminal of the latch 74. The input reference voltage to the comparator 68 provided by the divider resistors 70 and 72 may be assumed to be substantially zero so that any slight increase in charge on the integration capacitor 56 will operate to trigger the comparator 68 into providing a high (binary logic 1) output signal level. Although the zero input reference voltage level to the comparator 68 is an idealized representation, it will be readily understood to those of ordinary skill in the art that a slight offset to the input reference voltage to the comparator 68 must in actuality be provided.

With the infrared transmitter 16 turned off in the aforementioned manner, the photoresponsive element 24 responds only to the detection of ambient scene light from the scene to be photographed and provides an output current signal that is subsequently multiplied by the current mirrors 30, 36 and 40 to provide an output current signal along line 44 that is eight times the original current signal provided from the photoresponsive element 24. The multiplied current signal in the line 44, in turn, is directed to the current mirror 47 so as to be multiplied by a factor of one and thereafter directed by way of line 54 to charge the integration capacitor 56 with an input current signal that is eight times the output current signal from the photoresponsive element 24. The output current signal from the current mirror 36 which is four times the output current signal from the photoresponsive element 24, in turn, is directed by way of line 38 to input the current mirror 42 so as to enable the current mirror 42 to receive a discharge current signal from the integration capacitor 56 which is equivalent to four times the output current signal from the photoresponsive element 24.

Thus the integration capacitor 56 is charged by an input current signal along line 54 from the current mirror 47 which is eight times the output current signal from the photoresponsive element 24 while simultaneously being discharged through the current mirror 42 by a current signal which is four times the output current signal from the photoresponsive element 24. The net effect is that the integration capacitor 56 is charged starting at time $T_0$ with an input current signal which is four times the output current signal from the photoresponsive element 24. This charging current signal operates to cause the voltage at the positive terminal of the integration capacitor 56 to ramp upwardly in a waveform as shown at C in FIG. 2. The upwardly ramping waveform C operates to immediately trigger the comparator 68 in a manner as previously described to provide a high (binary logic 1) output signal to the latch 74 and thereby set the latch 74 to provide a low (binary logic 0) output signal level.

At time $T_1$, which may be in the order of 1 millisecond subsequent to time $T_0$, the timer 58 again switches to provide a high (binary logic 1) output signal level as shown by the waveform A in FIG. 2. This high (binary logic 1) output signal level is directed by way of the base resistor 60 to turn on the NPN transistor 52 which subsequently operates to turn on the PNP transistor 46 and thereby turn off the current mirror 47. Simultaneously to this, the high (binary logic 1) output signal level of waveform A is directed along line 79 to switch the output from the AND gate 80 to provide a high (binary logic 1) output signal level which, in turn, gates the switch 82 to turn on the infrared emitting diode 18. In this manner the current mirror 47 is turned off so as to provide no further charging current by way of the line 54 to the integration capacitor 56 at the same instant that the infrared emitting diode 18 is turned on to provide the beam of infrared radiation as shown in FIG. 1.

As previously discussed, when the photographic subject is located within the near distance zone as shown in FIG. 1, infrared radiation from the infrared emitting diode 18 will be reflected back for detection by the photoresponsive element 24. Thus in this situation the photoresponsive element 24 will detect not only the ambient scene radiation previously detected during the time interval from $T_0$ to $T_1$ but, in addition, will detect the reflected infrared radiation from the photographic subject. Therefore, when the photographic subject is located within the near distance zone, the photoresponsive element 24 provides an output current signal in a time interval subsequent to $T_1$ greater than the output current signal provided in the previous time interval from $T_0$ to $T_1$. The current signal output from the photoresponsive element 24 is thereafter multiplied by the current mirrors 30, 36 and 42 in the aforementioned manner. The output current signal from the current mirror 42 which is equivalent to four times the output current signal from the photoresponsive element 24, thereafter operates to discharge the integration capacitor 56. Since the current mirror 47 is turned off by the control transistor 46 as previously discussed, there is no charging current signal provided to the integration capacitor 56 subsequent to the time $T_1$, and the voltage at the positive terminal of the integration capacitor 56 ramps downwardly as shown by the waveform C of FIG. 2. This discharge current effectively provides a reverse integration of the output current signal from the photoresponsive element 24 which offsets the previous integration which occurred between time $T_0$ and $T_1$.

The timer 58 will subsequently switch at a time immediately prior to $T_2$ to provide a low (binary logic 0) output signal level as shown by the waveform B of FIG. 2 so as to disable the AND gate 80 from providing its affirmative logic signal to the switch 82 and thereby turn off the infrared emitting diode 18. The low (binary logic 0) output signal level of waveform B from the timer 58 is also directed to the latch 74. Under the aforementioned conditions where the photographic subject is located within the near distance zone from the photographic camera apparatus 10 as shown in FIG. 1, the integration capacitor 56 will be discharged at a greater rate than it was previously charged as illustrated by the waveform C so as to switch the comparator 68 to provide a low (binary logic 0) output signal level to the latch 74 prior to the time at which the timer 58 switches to provide its low (binary logic 0) output signal level to the latch 74. Thus the switching of the comparator 68 prior to the switching of the output waveform B from the timer 58 operates in a well-known manner to switch the latch 74 to provide a high (binary logic 1) output signal level indicative of the photographic subject in the scene being located within the near distance zone from the photographic camera. As is readily understood, subsequent switching of the output waveform B from the timer 58 to a low (binary logic 0) output signal level would not affect the low (binary logic 0) output signal level from the latch 74. As is readily apparent, the timing intervals from time $T_0$ to time $T_1$ are substantially equivalent to the time interval from time $T_1$ to time $T_2$ and may preferably be in the order of 1 millisecond apiece in order to enable the ranging circuit 28 not to be influenced by 60 cycle light especially from a fluorescent light source.

Conversely, if the subject is located beyond the near distance zone from the photographic camera in FIG. 1, no infrared radiation would be reflected back to the photoresponsive element 24 and there would be no increase in the current output from the photoresponsive element 24 during the time interval from time $T_1$ to time $T_2$; and, hence, the integration capacitor 56 would discharge at substantially the same rate at which it was previously charged during the time interval from time $T_0$ to time $T_1$. Since the output waveform B from the timer 58 switches from a high (binary logic 1) output signal level to a low (binary logic 0) output signal level at a time immediately prior to time $T_2$, it is apparent that the output waveform B from the timer 58 will switch prior to the comparator 68 so as to cause the latch 74 to switch to a low (binary logic 0) output signal level indicative of a subject located in the far distance zone from the photographic camera 10 as shown in FIG. 1.

In this manner, a two zone ranging output signal can be provided in a simple and economical manner without regard to the ambient scene light intensity since the two zone ranging system of this invention depends only upon the reflection of infrared radiation from the subject. When the subject is located within the near distance zone from the photographic camera, it is apparent that a low output infrared emitting diode 18 may be utilized in order to minimize costs. The two zone output signal may be used in any well-known manner to control the focusing of the objective lens 12 between a near and far focus zone or, alternatively, to control the firing of an electronic flash in a manner that might prohibit the camera from operating when the subject to be photographed is located in the far distance zone from the photographic camera 10.

Under certain conditions of minimum ambient scene light intensity, there may be insufficient ambient scene light detected by the photoresponsive element 24 to sufficiently charge the integration capacitor 56 during the time interval from time $T_0$ to time $T_1$ to affect the switching of the latch 68. Under these conditions, an alternate current signal is introduced by an alternative current source 90 to input the current mirror 40. The alternative current source 90 is controlled from a comparator 84 which derives an input reference voltage from a resistor divider network comprising the resistors 86 and 88 for comparison to an input voltage signal corresponding to the output current signal from the current mirror 30 along line 34. Thus under conditions of low ambient scene light intensity where little or no scene light is detected by the photoresponsive element 24 resulting in little or no current being directed to the current mirror 30, the comparator 84 senses the low current signal output from the current mirror 30 along line 34 and operates to turn on the alternative current source 90 to provide a constant steady state input current signal to the current mirror 40. This, in turn, enables the integration capacitor 56 to provide the output response as shown by the waveform C and thereby switch the comparator 68 in the aforementioned manner.

Other embodiments of the invention including additions, subtractions, deletions and other modifications of the preferred disclosed embodiments of the invention will be obvious to those skilled in the art and are within the scope of the following claims.

What is claimed is:

1. A dual zone ranging system for use with a photographic camera apparatus comprises:
   means for emitting radiation toward a scene to be photographed;
   means for detecting ambient radiation from the scene to be photographed and radiation emitted from said radiation emitting means and subsequently reflected from a subject in the scene to be photographed if the subject is located within a select distance range from the photographic camera apparatus and for providing an output responsive to the detected radiation; and
   means for integrating the output from said detecting means for a first select period during which said radiation emitting means are rendered inoperative and for a second select period during which said radiation emitting means are rendered operative and for providing an output signal in response to said integration indicative of whether the subject in the scene to be photographed is located in said select distance range from the photographic camera, wherein the integration during one of said select periods is offset by the integration during the other of said select periods and said output signal indicative of whether the subject is located in said select distance range is provided in response to said offsetting integration.

2. The dual zone ranging system of claim 1 wherein said radiation emitting means emits primarily infrared radiation.

3. The dual zone ranging system of claim 2 wherein said first and second select periods of integration are substantially the same.

4. The dual zone ranging system of claim 3 including means for providing an alternate output signal to said integrating means when the output from said detecting means during said first select period when said radiation emitting means are rendered inoperative is below a minimum select level.

5. The dual zone ranging system of claim 2 wherein the subject is determined to be within said subject distance range when the integration occurring during said one selected period is completely offset by the integration occurring during said other selected period.

6. The dual zone ranging system of claim 5 wherein said first and second select periods of integration are substantially the same.

7. The dual zone ranging system of claim 6 wherein said integrating means includes timing means for providing timing signals for said first and second select periods and control means responsive to said timing signals for controlling said integration during said first and second select time periods and for rendering said radiation emitting means inoperative and operative during said first and second select time periods respectively.

8. The dual zone ranging system of claim 7 wherein said detecting means provides an output current signal and wherein said integrating means includes: an integration capacitor, means for multiplying said output current signal from said detecting means so as to charge said integration capacitor during said first select period at a select rate corresponding to said output current signal and subsequently discharge said integration capacitor during said second select period at said select rate, and latch means responsive to the discharge of said integration capacitor to a select level prior to the expiration of said second select period for providing said output signal indicative of the subject of the scene to be photographed being in said select distance range from the photographic camera apparatus.

9. The dual zone ranging system of claim 8 wherein said means for multiplying said output current signal from said detecting means comprises at least one current mirror circuit connected in current charging relation with respect to said integration capacitor and at least another current mirror circuit connected in current discharging relation with respect to said integration capacitor wherein said control means operates to inhibit said one current mirror from providing charging current to said integration capacitor during said second select period.

10. The dual zone ranging system of claim 7 including means for providing an alternate output signal to said integrating means when the output from said detecting means during said first select period is below a minimum select level.

* * * * *